(12) United States Patent
Murata et al.

(10) Patent No.: US 8,388,147 B2
(45) Date of Patent: Mar. 5, 2013

(54) SCREEN ASSEMBLY AND REAR-PROJECTION TYPE GRAPHIC DISPLAY DEVICE

(75) Inventors: Toshitaka Murata, Yokohama (JP);
Ryusaku Takahashi, Yokohama (JP);
Masahiko Miyake, Yokohama (JP);
Manabu Kobayashi, Yokohama (JP);
Takatsugu Aizaki, Yokohama (JP);
Hironobu Fukutomi, Yokohama (JP)

(73) Assignee: JVC Kenwood Corporation, Yokohama-shi, Kanagagawa (JP)

( * ) Notice: Subject to any disclaimer, the term of this patent is extended or adjusted under 35 U.S.C. 154(b) by 213 days.

(21) Appl. No.: 12/654,287

(22) Filed: Dec. 16, 2009

(65) Prior Publication Data

US 2010/0165303 A1 Jul. 1, 2010

(30) Foreign Application Priority Data

Dec. 25, 2008 (JP) ................................. P2008-330708

(51) Int. Cl.
*G03B 21/14* (2006.01)
(52) U.S. Cl. ............... 353/79; 353/72; 353/73; 353/74; 353/75; 353/77; 353/119; 353/122; 359/443; 359/448
(58) Field of Classification Search .................. 353/72, 353/73, 74, 75, 77, 79, 119, 122; 359/443, 359/448, 453, 454, 455, 456, 457, 460, 742; 349/5, 7, 8, 9
See application file for complete search history.

(56) References Cited

U.S. PATENT DOCUMENTS
(Continued)

FOREIGN PATENT DOCUMENTS

| JP | 09-197559 A | 7/1997 |
|---|---|---|
| JP | 09-219834 A | 8/1997 |

(Continued)

OTHER PUBLICATIONS

Official Action, issued on Jan. 4, 2011, in the counterpart Japanese application.

*Primary Examiner* — Georgia Y Epps
*Assistant Examiner* — Sultan Chowdhury
(74) *Attorney, Agent, or Firm* — Nath, Goldberg & Meyer; Jerald L. Meyer; Stanley N. Protigal

(57) ABSTRACT

A screen assembly and a rear-projection type graphic display device are provided to block overscanned light Lo projected outside a fresnel lens screen. The screen assembly 20A includes the fresnel lens screen 21, a screen retainer 22 and a light blocking member 23. The fresnel lens screen 21 forms an image on the side of a front surface 21b by image light Le incoming through a back surface 21a. The screen retainer 22 has a back surface 22a whose area is larger than the back surface 21a and the front surface 21b and which is opposed to the front surface 21b to hold it, and a front surface 22b located on opposite side of the back surface 22a to allow an image formed by the image light incoming through the back surface 21a to be visible through the front surface 22b. The screen retainer 22 has an optical transparency. The light blocking member 23 is arranged so as to surround respective side surfaces of the screen 21 in the form of a frame. At least part of the light blocking member 23 is arranged so as to project to the side of the back surface 21a of the screen.

9 Claims, 8 Drawing Sheets

U.S. PATENT DOCUMENTS

| | | | |
|---|---|---|---|
| 5,914,809 A * | 6/1999 | Mitani et al. | 359/457 |
| 6,836,363 B2 * | 12/2004 | Goto et al. | 359/460 |
| 7,029,128 B2 * | 4/2006 | Nishio et al. | 353/94 |
| 7,102,820 B2 * | 9/2006 | Peterson et al. | 359/457 |
| 7,173,761 B2 * | 2/2007 | Yoshida | 359/457 |
| 7,215,470 B2 * | 5/2007 | Kato et al. | 359/443 |
| 7,460,299 B2 * | 12/2008 | Ogawa et al. | 359/443 |
| 7,880,965 B2 * | 2/2011 | Michimori et al. | 359/446 |
| 2004/0070845 A1 * | 4/2004 | Karasawa et al. | 359/742 |
| 2005/0030489 A1 * | 2/2005 | Togino | 353/74 |

FOREIGN PATENT DOCUMENTS

| | | |
|---|---|---|
| JP | 11-133509 A | 5/1999 |
| JP | 2003-207740 A | 7/2003 |
| JP | 2006-065185 A | 3/2006 |
| JP | 2007-058030 A | 3/2007 |
| JP | 2008-158495 A | 7/2008 |

* cited by examiner

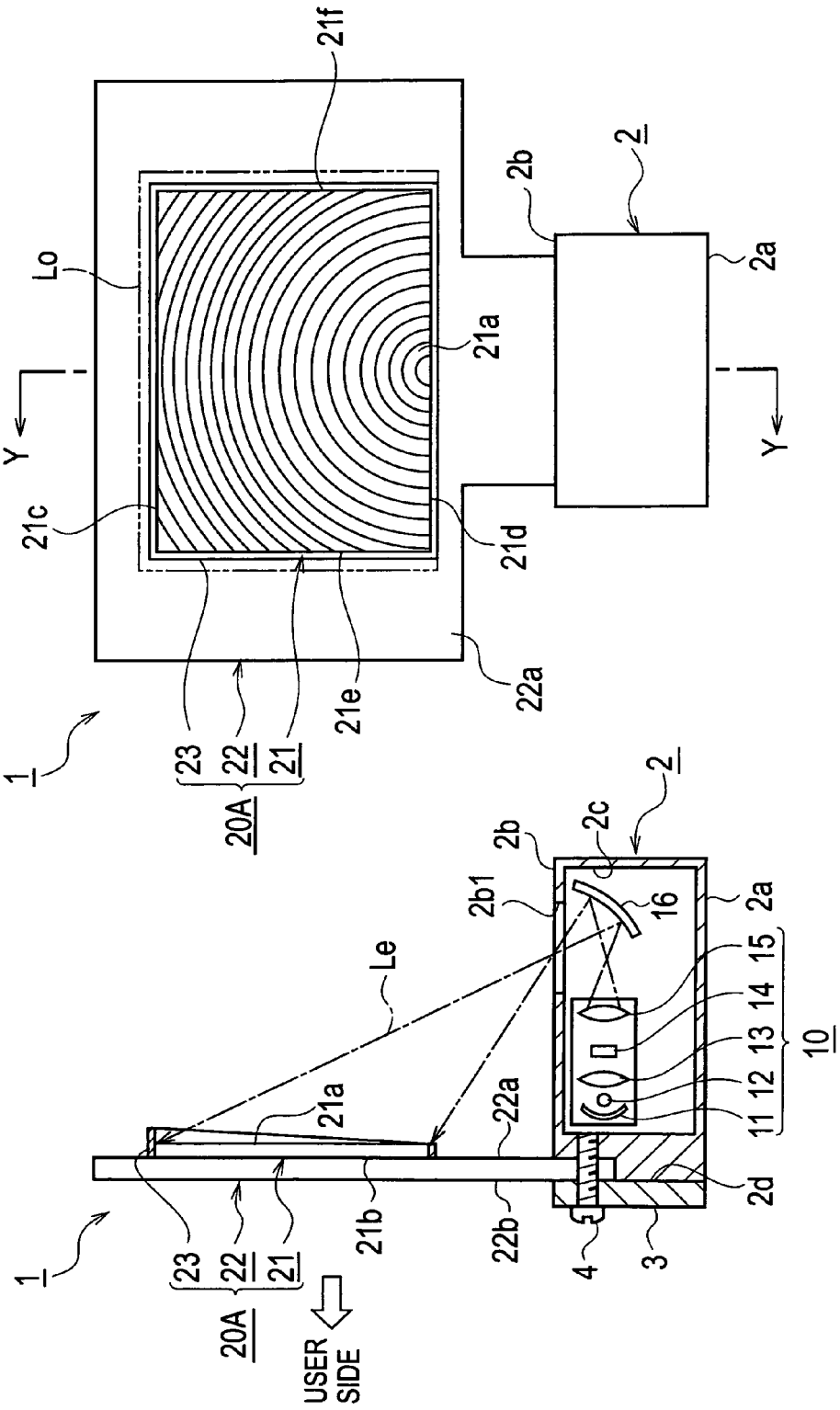

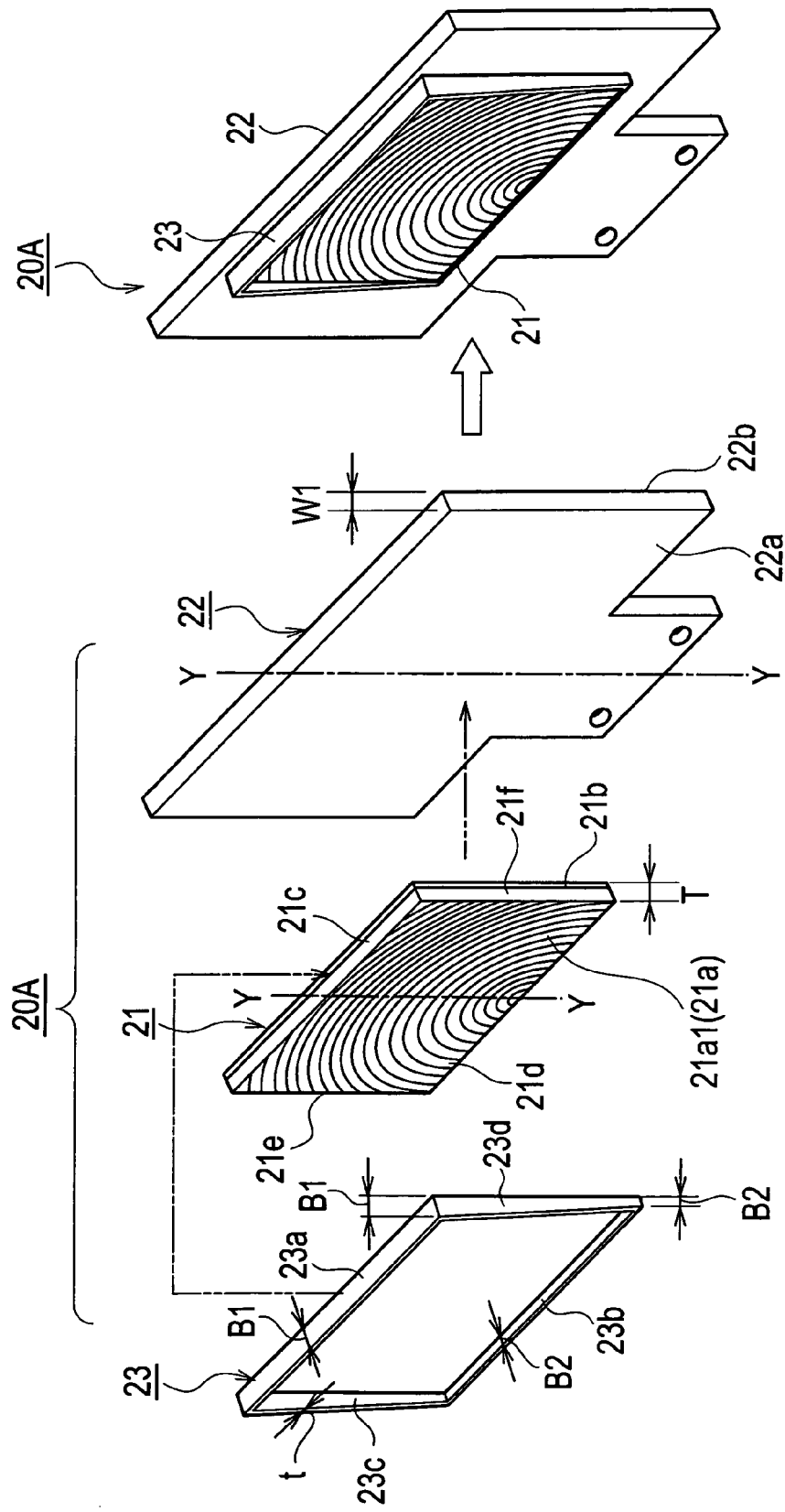

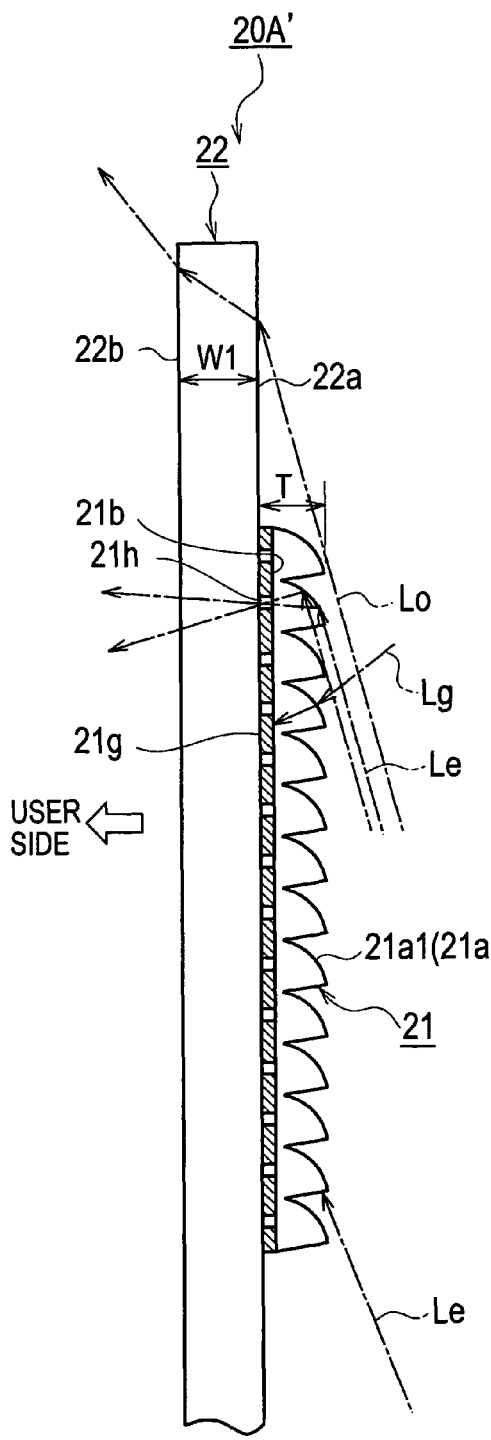
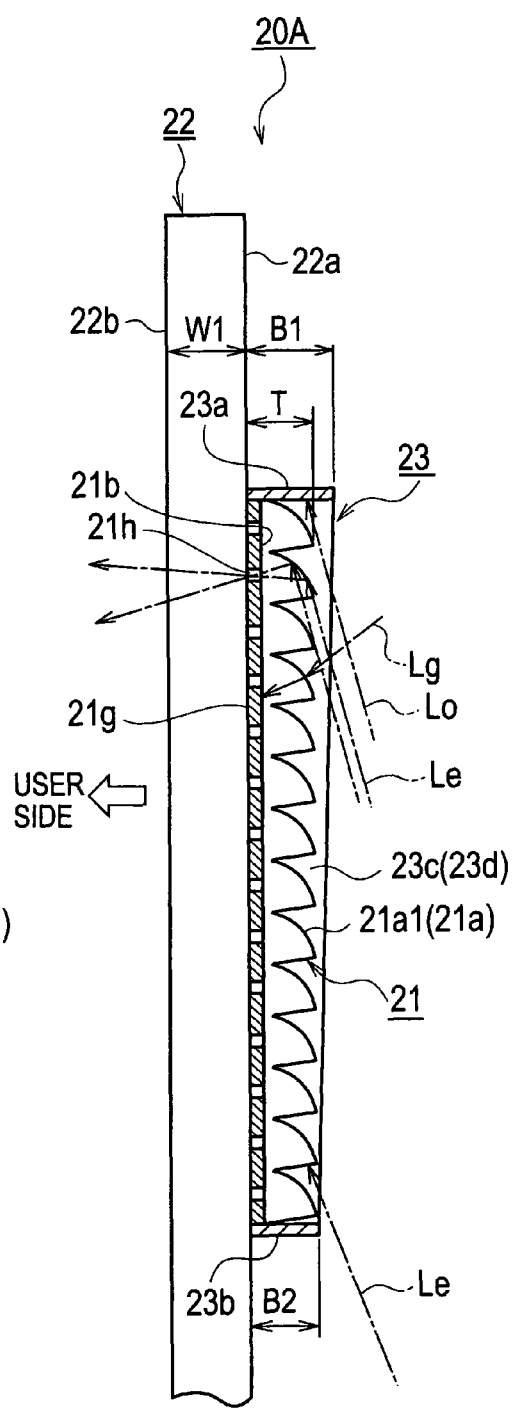

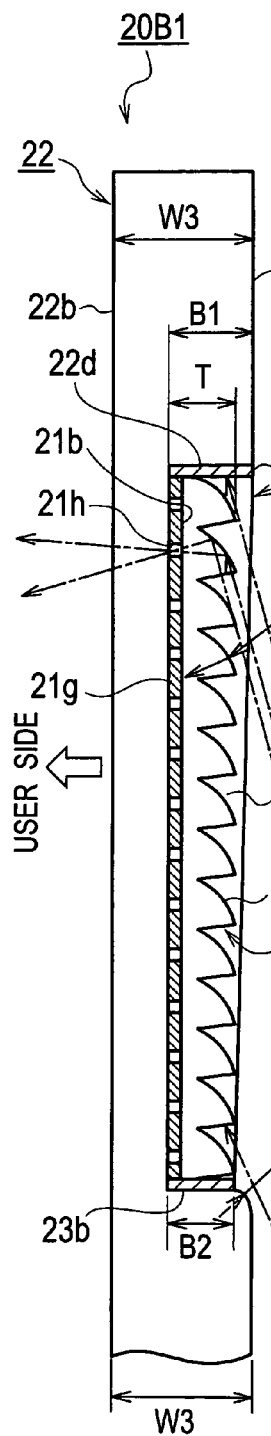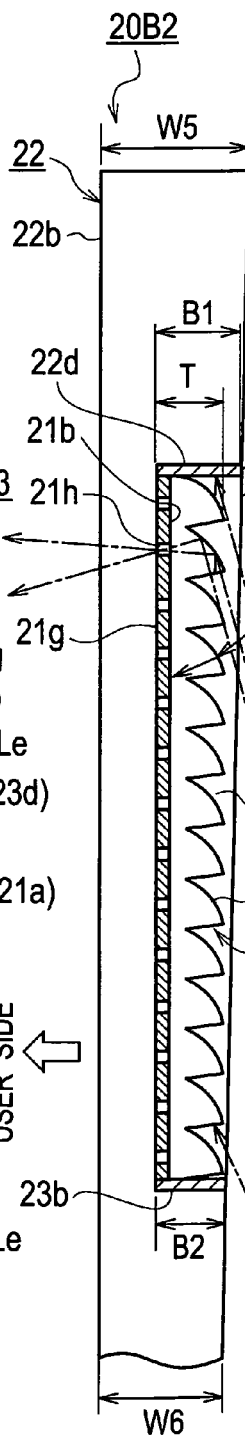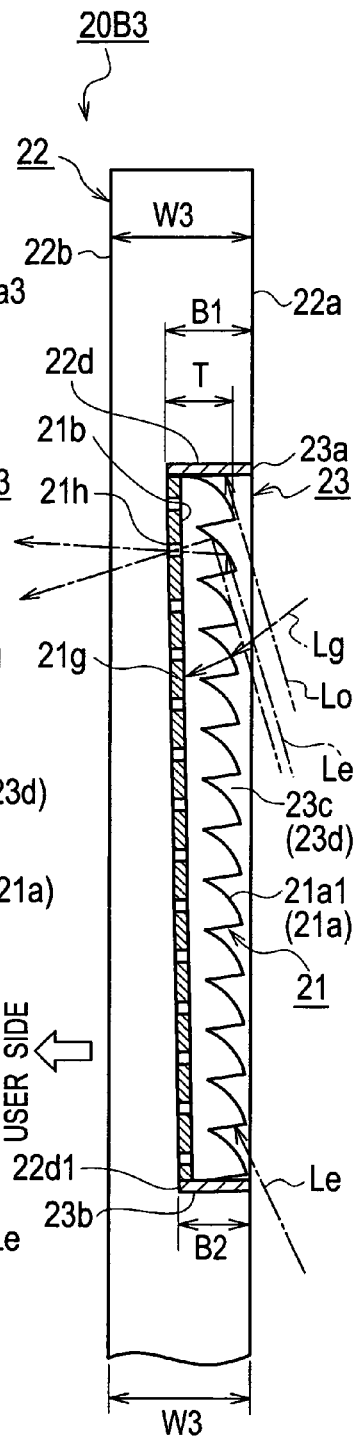

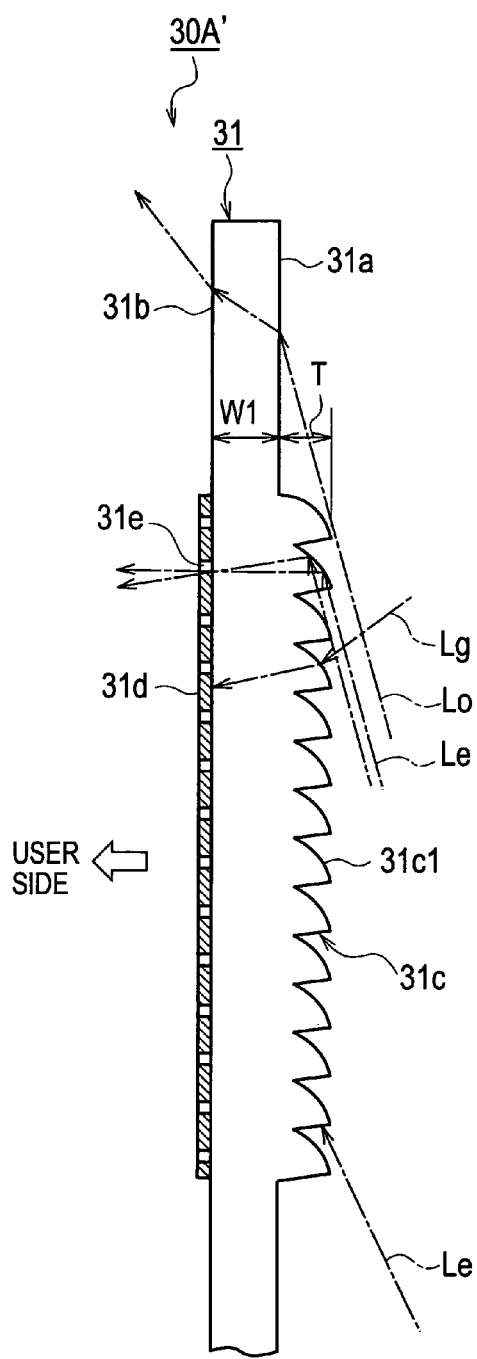
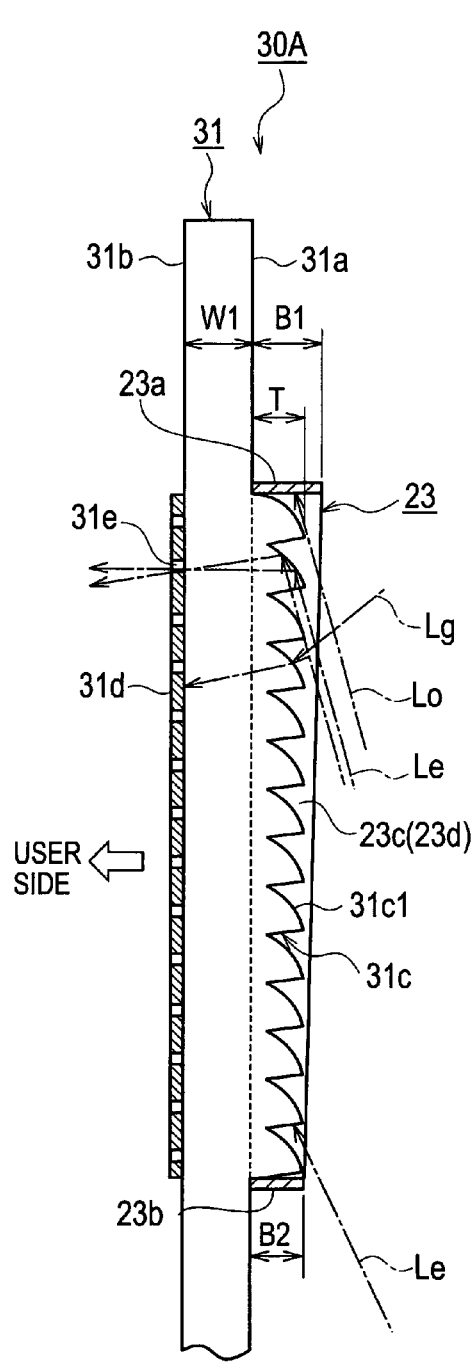

SCREEN ASSEMBLY AND REAR-PROJECTION TYPE GRAPHIC DISPLAY DEVICE

BACKGROUND OF THE INVENTION

1. Field of the Invention

The present invention relates to a screen assembly and a rear-projection type graphic display device both of which can block overscanned light that is produced in a peripheral area of image light when back-projecting it emitted from a projection area on a screen having an optical transparency

2. Description of the Related Art

In the projection type graphic display device that projects an image displayed on a liquid crystal panel (i.e. a type of image display element or light modulation device) on a screen in enlargement due to a projection optical system, there are a variety of structural forms. They are broadly-divided into a group of front-projection type graphic display devices for projecting images on the screen from the front and another group of rear-projection type graphic display devices for projecting images on the screen from behind. In view of widespread utilization, the rear-projection type graphic display device is popular in comparison with the front-projection type graphic display device since the former is compact so as to require a smaller installation area.

As for the operation of projecting an image projected from a projection unit on a rear (back) surface of the screen, in the above rear-projection type graphic display device, it is difficult for the projection unit to project an image so that a projected image conforms with a screen size (or overall size) perfectly. Thus, in order to prevent a projected image from getting insufficiency at the periphery of the screen, there has been performed so-called "overscan" to project an image in a somewhat larger size than the screen size (overall size). In this overscan operation, a light projected toward an external side of the screen size is often called to as "overscanned light".

Japanese Patent Publication Laid-open No. 11-133509 discloses a fresnel lens sheet and a rear-projection type display device. In this display device, a screen comprises a transparent panel, a lenticular lens sheet and a fresnel lens sheet, which are overlapped in this order. On the side of the transparent panel of the screen, there is an opaque screen frame forming a window frame smaller than the fresnel lens sheet in order to project an image from the back surface of the fresnel lens sheet. In the display device constructed above, the overscanned light projected against the outer circumference of the back surface of the fresnel lens sheet is blocked by the opaque screen frame outside the window frame. Further, in order to prevent an occurrence of stray light, which might be produced since the overscanned light projected to the outer periphery of the back surface of the fresnel lens sheet is reflected by the fresnel lens sheet, a flat area is formed along the outer periphery of the back surface of the fresnel lens sheet.

SUMMARY OF THE INVENTION

In the display device disclosed in the above-described Patent Document, the screen frame outside the window frame has to be an opaque body in order to block the overscanned light projected to the outer periphery of the back surface of the fresnel lens sheet.

Meanwhile, in providing newly-developed screen assembly and rear-projection type graphic display device, there is a developer's demand that when viewing an image projected on the back surface of a screen having a fresnel lenses from the front side of the screen, the image can be displayed on the screen as if it were floating in the air. In order to fulfill such a demand, it is necessary to drape a transparent screen retainer over the outer circumference of the screen having fresnel lenses. That is, a technical idea disclosed in the above-described Patent Document is inapplicable for the purpose of light shielding of the transparent screen retainer from the overscanned light.

In the disclosed fresnel lens sheet and rear-projection type display device, additionally, as the window frame smaller than the fresnel lens sheet is opened in the opaque screen frame, a screen defined inside the window frame become reduced in size and furthermore, the whole area of the fresnel lens sheet is not utilized effectively.

In allowing an incidence of image light projected and overscanned from a projection unit on the back surface of a screen and an emission of the image light to the front side of the screen, an object of the present invention is to provide a screen assembly including a rectangular light transmissive screen having fresnel lenses and a screen retainer for retaining the screen while covering the outer circumference of the screen, and a rear-projection type graphic display device both of which can block overscanned light projected outside the screen.

In order to achieve the above object, according to the first aspect of the present invention, there is provided a screen assembly comprising: a screen having fresnel lenses, a first surface allowing an incoming of an image light therethrough and a second surface allowing an emission of the image light therethrough, the screen having an optical transparency; a screen retainer having a third surface whose area is larger than the first surface and the second surface of the screen and which is opposed to the second surface of the screen thereby to hold the second surface, and a fourth surface located on opposite side of the third surface thereby to allow an image formed by the image light incoming through the first surface to be visible through the fourth surface, the screen retainer an optical transparency; and a light blocking member surrounding respective side surfaces of the screen in the form of a frame, wherein at least part of the light blocking member is arranged so as to project to the side of the first surface of the screen.

In order to achieve the above object, according to the second aspect of the present invention, there is also provided a rear-projection type graphic display device comprising:

a screen assembly including: a screen having fresnel lenses, a first surface allowing an incoming of an image light therethrough and a second surface allowing an emission of the image light therethrough, the screen having an optical transparency; a screen retainer having a third surface whose area is larger than the first surface and the second surface of the screen thereby and which is opposed to the second surface of the screen thereby to hold the second surface, and a fourth surface located on opposite side of the third surface thereby to allow an image formed by the image light incoming through the first surface to be visible through the fourth surface, the screen retainer an optical transparency; and a light blocking member surrounding respective side surfaces of the screen in the form of a frame, wherein at least part of the light blocking member is arranged so as to project to the side of the first surface of the screen;

a projection unit emitting the image light based on input signals from an outside;

a reflection mirror reflecting the image light emitted from the projection unit toward the screen assembly thereby to project an image thereon in enlargement; and a cabinet on which the screen assembly stands and in which the projection unit and the reflection mirror are accommodated.

BRIEF DESCRIPTION OF THE DRAWINGS

FIG. 1A is a sectional view taken along a line Y-Y of FIG. 1B, showing a screen assembly and a rear-projection type graphic display device in accordance with a first embodiment of the present invention;

FIG. 1B is a rear view of the screen assembly and the rear-projection type graphic display device of FIG. 1A;

FIG. 2 is a perspective view explaining the assembling order of the screen assembly of the first embodiment of the present invention;

FIGS. 3A to 3D are views explaining a Fresnel lens screen shown in FIGS. 1A, 1B and 2, in which FIG. 3A is a rear view of the Fresnel lens screen, FIG. 3B a sectional view of the Fresnel lens screen in a first structural form taken along a line Y-Y of FIG. 3A, FIG. 3C a sectional view of the Fresnel lens screen in a second structural form taken along a line Y-Y of FIG. 3A and FIG. 3D is a sectional view of the Fresnel lens screen in a third structural form taken along a line Y-Y of FIG. 3A;

FIGS. 4A and 4B are longitudinal sectional views explaining the operation of blocking overscanned light against a screen retainer having visible optical transparency in the screen assembly of the first embodiment of the present invention, in which FIG. 4A shows a comparative example to the first embodiment, and FIG. 4B shows the first embodiment;

FIGS. 5A and 5B are longitudinal sectional views explaining the operation of blocking overscanned light against a screen retainer having visible optical transparency in the screen assembly of the second embodiment of the present invention, in which FIG. 5A shows a comparative example to the second embodiment, and FIG. 5B shows the second embodiment;

FIGS. 6A, 6B and 6C are longitudinal sectional views showing first, second and third modifications where the screen assembly of the second embodiment of the present invention is modified in part, respectively;

FIGS. 7A and 7B are longitudinal sectional views explaining the operation of blocking overscanned light against a screen retainer having visible optical transparency in the screen assembly of the third embodiment of the present invention, in which FIG. 7A shows a comparative example to the third embodiment, and FIG. 7B shows the third embodiment; and FIGS. 8A and 8B are longitudinal sectional views explaining the operation of blocking overscanned light against a screen retainer having visible optical transparency in the screen assembly of the fourth embodiment of the present invention, in which FIG. 8A shows a comparative example to the fourth embodiment, and FIG. 8B shows the third embodiment.

DETAILED DESCRIPTION OF THE PREFERRED EMBODIMENTS

There will be described below embodiments of a screen assembly and a rear-projection type graphic display device of the present invention, in the order corresponding to the first, second, third and fourth embodiments, with reference to FIGS. 1A to 8B.

1$^{st}$. Embodiment

Figure 3A:
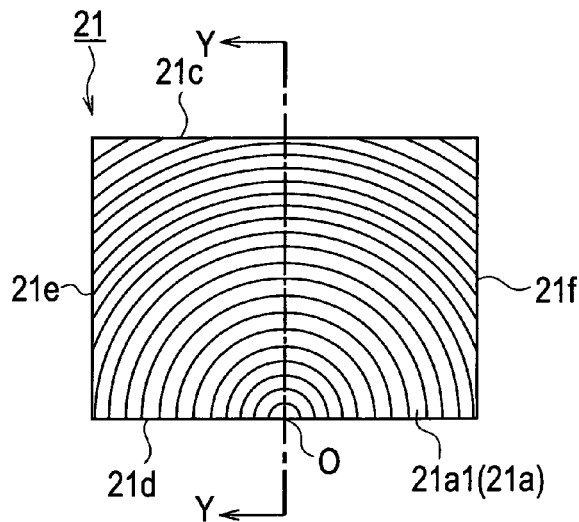
Figure 3B:
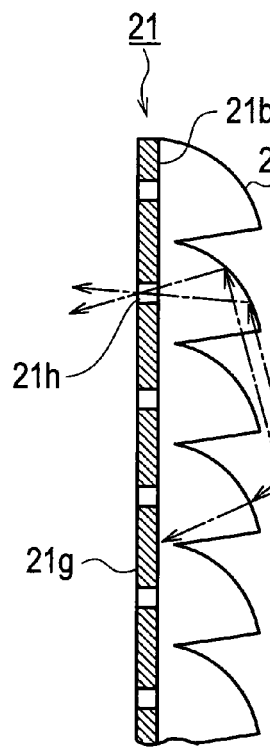
Figure 3C:
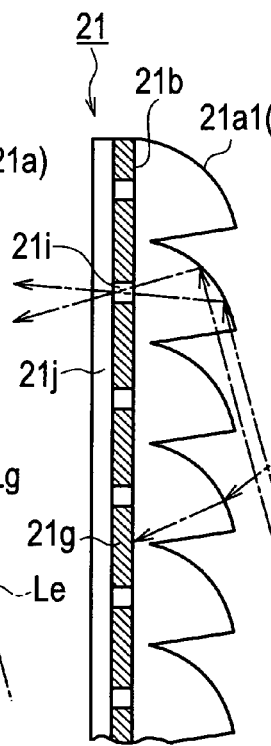
Figure 3D:
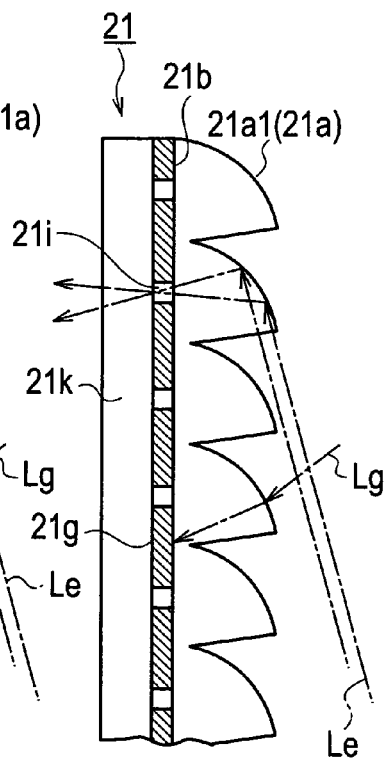

FIG. 1A is a sectional view taken along a line Y-Y of FIG. 1B, showing a screen assembly and a rear-projection type graphic display device in accordance with the first embodiment of the present invention. FIG. 1B is a rear view of the screen assembly and the rear-projection type graphic display device of FIG. 1A. FIG. 2 is a perspective view explaining the assembling order of the screen assembly of the first embodiment of the present invention. FIGS. 3A to 3D are views explaining a Fresnel lens screen shown in FIGS. 1A, 1B and 2. In these figures, FIG. 3A is a rear view of the Fresnel lens screen. FIG. 3B is a sectional view of the Fresnel lens screen in a first structural form taken along a line Y-Y of FIG. 3A. FIG. 3C is a sectional view of the Fresnel lens screen in a second structural form taken along a line Y-Y of FIG. 3A. FIG. 3D is a sectional view of the Fresnel lens screen in a third structural form taken along a line Y-Y of FIG. 3A. FIGS. 4A and 4B are longitudinal sectional views explaining the operation of blocking overscanned light against a screen retainer having visible optical transparency in the screen assembly of the first embodiment of the present invention. In these figures, FIG. 4A shows a comparative example to the first embodiment, and FIG. 4B shows the first embodiment.

In the following description, the rear-projection type graphic display device of the invention is provided, on a top surface of a casing, with any one of later-mentioned screen assemblies of the first to fourth embodiments. Nevertheless, we described only the rear-projection type graphic display device of the invention on application of the screen assembly of the first embodiment, and the description about the rear-projection type graphic display device will be eliminated in the later descriptions of the screen assemblies of the second, third and fourth embodiments.

As shown in FIGS. 1A and 1B, the graphic display device 1 of the present invention is formed as a rear projection type. As a base of the device 1, a cabinet 2 is provided in the form of a box. In the cabinet 2, its bottom surface 2$a$ is arranged on a floor, and a projection window 2$b$1 is formed so as to open on the rear side of a top surface 2$b$. A later-mentioned screen assembly 20A of the first embodiment is arranged so as to stand on the top surface (part) 2$b$, in front of the window 2$b$1.

In an interior 2$c$ of the cabinet 2, there are a projection unit 10 and an aspherical reflection mirror 16, allowing an oblique projecting of images. Starting from the left in FIG. 1A, the projection unit 10 includes a concave reflection mirror 11, a light source 12, a illuminating lens 13, a liquid crystal panel 14 as one light modulation device and a projection lens 15.

In operation, white light is radiated from the light source 12 in the projection unit 10. Then, the white light is reflected by the concave reflection mirror 11 and further transmitted through the illuminating lens 13 to illuminate the liquid crystal panel 14. While, the liquid crystal panel 14 displays an image corresponding to input signals from the outside. Consequently, resultant image light Le is projected from the liquid crystal panel 14 and further transmitted through the projection lens 15. Then, the image light Le is reflected by the aspherical reflection mirror 16 obliquely upward. Through the window 2$b$1, the so-reflected image light Le is projected on a back surface 21$a$ of a screen 21 forming the screen assembly 20A. The screen 21 is also provided, on the side of the back surface 21$a$, with a fresnel lens 21$a$1 for converting the propagation direction of the image light forwardly. Therefore, the screen 21 will be referred to as "fresnel lens screen 21" after. In this way, the image light is transmitted through the fresnel lens screen 21 to display an image on the side of a front surface 21$b$ of the screen 21, allowing a user to watch the image displayed on the side of the front surface 21$b$.

The embodiment shown in FIG. 1 employs a lamp having the concave reflection mirror 11 and light source 12, for example, an extra high pressure mercury lamp, a xenon lamp, etc. Alternatively, a semiconductor light source, such as LED (light emitting diode), may be used as the lamp.

In order to prevent an image (part) from dropping out on the periphery of the fresnel lens screen 21, the graphic display device 1 is adapted so as to perform so-called "overscan" to project an image in a picture size somewhat larger than an overall size of the fresnel lens screen 21.

The image light Le from the projection unit 10 performing "overscan" is reflected by the aspherical reflection mirror 16 and enters the back surface 21a of the fresnel lens screen 21 obliquely.

When the image light Le is emitted from the front surface 21b of the fresnel lens screen 21, as shown with an imaginary line of FIG. 1B, it is performed to take measures of preventing overscanned light Lo of the image light Le from being projected on the exterior of the overall size of the fresnel lens screen 21. Then, it is desirable that an "overscan" ratio of between an area of the image light Le at the screen 21 and an area of the screen 21 is less than 3% of the overall size of the fresnel lens screen 21.

In the first embodiment, the screen assembly 20A comprises the rectangular-shaped fresnel lens screen 21 made of resinous material having an optical transparency and also provided with the back surface 21a for allowing an incoming of image light Le and the front surface 21b for allowing an emission of the image light Le, a light transmissive screen retainer 22 for holding the screen 21 while covering the front surface 21b of the screen 21 and its outside periphery and a light blocking member 23 arranged along an upside surface (first side surface) 21c of the fresnel lens screen 21, an underside surface (second side surface) 21d, a left side surface (third side surface) 21e and a right side surface (fourth side surface) 21f to block the overscanned light Lo projected out of the fresnel lens screen 21.

In the screen assembly 20A, the screen retainer 22 is arranged so as to stand between a front surface 2d of the cabinet 2 and a pusher plate 3 substantially perpendicularly to the top surface 2b. Again, the screen retainer 22 is fixed on the front surface 2d by screws 4 or the like (e.g. adhering).

The screen assembly 20A of the first embodiment will be described below, in more detail.

As shown in FIG. 2, in the screen assembly 20A of the first embodiment, the fresnel lens screen 21 having an optical transparency and the screen retainer 22 having visible optical transparency and an area larger than that of the fresnel lens screen 21 are provided independently of each other. In the fresnel lens screen 21, by means of adhesive or the like, the front surface 21b is secured to the back surface 22a of the screen retainer 22 so that their center lines Y-Y coincide with each other, producing a symmetric appearance.

Thus, by the fresnel lens screen 21 and the screen retainer 22 as constituents, the screen assembly 20A is simple in structure and therefore, it can be manufactured at a moderate price.

As described previously, the fresnel lens screen 21 has a function of changing the direction of the image light, which has been emitted from the projection unit 10 (FIG. 1A) to the aspherical reflection mirror 16 and successively projected on the back surface 21a obliquely, toward the front surface 21b. Using acryl resin having optical transparency, as shown in FIG. 3A, the fresnel lens screen 21 is formed so as to be rectangular, for example, 52 inches in its overall size.

In the fresnel lens screen 21, additionally, all of the upside surface 21c, the underside surface 21d, the left side surface 21e and the right side surface 21f are together formed to be flat. On the back surface 21a, the fresnel lens 21a1 is wavy-shaped so that its center is on the center line Y-Y and deviates from a gravity center of the screen 21 downwardly, that is, on the side of the underside surface 21d. As shown in FIG. 3, the fresnel lens 21a1 comprises a number of concentric lenses.

The fresnel lens screen 21 may be provided with a variety of structural forms. FIGS. 3B, 3C and 3D are views showing a variety of sections of the fresnel lens screen 21 in enlargement.

In the first structural form shown in FIG. 3B, light blocking membranes 21g for blocking exterior light Lg and milky diffusion membranes 21h for diffusing the image light Le (from the projection unit 10) after image formation in front are formed on the front surface 21b of the fresnel lens screen 21 alternatively, corresponding to respective fresnel lenses 21a1.

In the second structural form shown in FIG. 3C, the light blocking membranes 21g for blocking the exterior light Lg and light transmissive membranes 21i for emitting the image light Le (from the projection unit 10) after image formation are formed on the front surface 21b of the fresnel lens screen 21 alternatively, corresponding to respective fresnel lenses 21a1. In addition, a milky diffusion membrane 21j is formed on the whole membranes 21g, 21i to diffuse the image light Le transmitted through the light transmissive membranes 21i, in front.

In the third structural form shown in FIG. 3D, the light blocking membranes 21g for blocking the exterior light Lg and the light transmissive membranes 21i for emitting the image light Le (from the projection unit 10) after image formation are formed on the front surface 21b of the fresnel lens screen 21 alternatively, corresponding to respective fresnel lenses 21a1. In addition, a lenticular lens sheet 21k is adhered to the whole membranes 21g, 21i to diffuse the image light Le transmitted through the light transmissive membranes 21i, in front.

Returning to FIG. 2, with the use of acryl resin having optical transparency, the screen retainer 22 is formed larger than the overall size of the fresnel lens screen 21 to cover the front surface 21b and the outside periphery of the screen 21. In the screen retainer 22, the back surface 22a and the front surface 22b are together flattened to provide a uniform thickness W1 therebetween, while a lower portion of the retainer 22 is fixed to the cabinet 2.

When viewing an image displayed on the front surface 21b of the fresnel lens screen 21 through the light transmissive screen retainer 22, the image gets into user's eyes as if it were floating in the air. Thus, it is possible to provide the display device with a gorgeous feeling.

The above-mentioned light blocking member 23 is formed by a black thin (metallic or resinous) plate impenetrable to light, a black film impenetrable to light, etc. having a thickness t less than 1 mm. Along the surfaces 21c to 21f of the fresnel lens screen 21, the light blocking member 23 is arranged so as to surround the fresnel lens screen 21, blocking the overscanned light Lo against the screen retainer 22 having visible optical transparency. For this reason, the light blocking member 23 is essential in the screen assembly of the first embodiment.

Again, the light blocking member 23 comprises an upper blocking part 23a along the upside surface 21c of the fresnel lens screen 21, a lower blocking part 23b along the underside surface 21d, a left blocking part 23c along the left side surface 21e, and a right blocking part 21f along the right side surface 21f. These blocking parts 23a to 23d are adhered to the surfaces 21c to 21f, respectively.

In the light blocking member 23, the upper blocking part 23a along the upside surface 21c is formed with a depth B1 larger than the thickness T of the fresnel lens screen 21. On the other hand, the lower blocking part 23b is formed with a depth B2 substantially equal to the thickness T of the screen 21. Further, the left and right blocking parts 23c, 23d are formed with respective depths larger than the thickness T of the fresnel lens screen 21.

In more detail, each of the left and right blocking parts 23c, 23d is tapered so as to have an uppermost depth B1 larger than a lowermost depth B2. The operation of the respective blocking parts 23a to 23d will be described later.

The operation of the screen assembly 20A of the first embodiment will be described in comparison with a comparative screen assembly 20A', with reference to FIGS. 4A and 4B.

As shown in FIG. 4A, in the comparative example of the first embodiment, the fresnel lens screen 21 of a thickness T is adhered to the back surface 22a of the screen retainer 22 of a thickness W1. Therefore, optically, the image light Le incident on the fresnel lenses 21a1 on the side of the back surface 21a of the screen 21 is converged at the diffusion membranes 22h to form an image and subsequently emitted toward the front surface 22b of the screen retainer 22.

However, owing to the absence of a blocking member around the fresnel lens screen 21, the overscanned light Lo from the projection unit 10 (FIG. 1) directly enters the screen retainer 22 through the back surface 22a and thereafter, the same light is emitted to the outside through the front surface 22b as shown in FIG. 4A. Then, the so-emitted overscanned light Lo is brought into a user's view, disturbing an image to be formed by the image light Le transmitted through the fresnel lens screen 21.

In the first embodiment, as shown in FIG. 4B, the light blocking member 23 is arranged around the fresnel lens screen 21 along four surfaces 21c to 21f (see FIGS. 1 to 3). Therefore, in terms of the behaviors of both image light Le and exterior light Lg after their incidences on the back surface 21a of the screen 21, the first embodiment is similar to the comparative example. However, as the overscanned light Lo is blocked by the blocking parts 23a to 23d of the blocking member 23, the overscanned light Lo cannot make an incidence on the screen retainer 22. As a result, it is possible for a user to see an image formed on the diffusion membranes 21h on the front surface 21b of the screen 21 as if the image were floating in the air.

In addition, as the upper blocking part 23a of the light blocking member 23 has a depth B1 larger than the thickness T of the fresnel lens screen 21, the overscanned light Lo projected against the upper portion of the screen 21 is blocked by the upper blocking part 23a completely, excluding the possibility of an incidence of the overscanned light Lo on the screen retainer 22.

While, as the lower blocking part 23b of the light blocking member 23 has a depth B2 substantially equal to the thickness T of the fresnel lens screen 21, the image light Le projected against the lower portion of the screen 21 can make an incidence on the back surface 21a of the screen 21 without being blocked by the lower blocking part 23b.

In addition, the left and right blocking parts 23c, 23d are together provided, on the incidence side of the light from the projection unit 10 (FIG. 1), with tapered contours. Thus, as the overscanned light Lo is blocked by the left and right blocking parts 23c, 23d, there is no possibility that the overscanned light Lo makes an incidence on the screen retainer 22.

In this way, according to the first embodiment, as the overscanned light Lo is not projected to the use's side through the front surface 22b of the screen retainer 22 owing to the provision of the light blocking member 23, a user can see favorable images displayed on the screen assembly 20A.

Figure 5A:
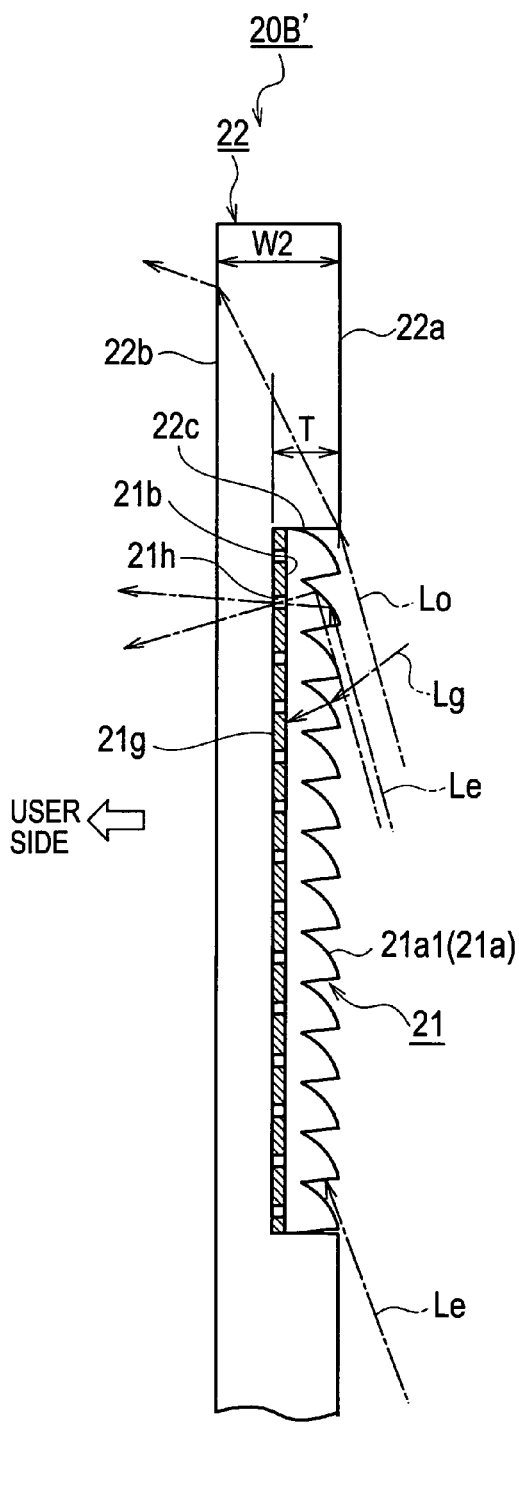
Figure 5B:
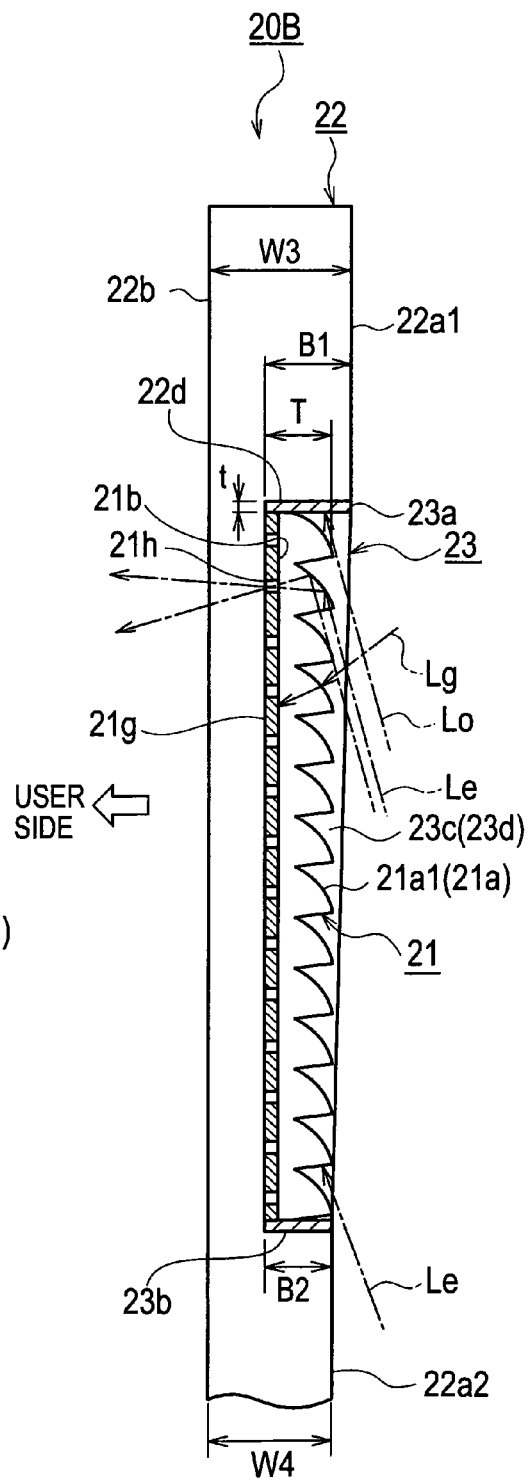

FIGS. 5A and 5B are longitudinal sectional views explaining the operation of blocking overscanned light against a screen retainer having visible optical transparency in the screen assembly of the second embodiment of the present invention. In the figures, FIG. 5A shows a comparative example to the second embodiment, while FIG. 5B shows the second embodiment. Further, FIGS. 6A, 6B and 6C are longitudinal sectional views showing first, second and third modifications where the screen assembly of the second embodiment of the present invention is modified in part, respectively.

As shown in FIGS. 5A and 5B, the second embodiment and the comparative example are similar to the first embodiment in that both the fresnel lens screen 21 and the light transmissive screen retainer 22 are formed independently of each other and also manufactured at a moderate price. However, the second embodiment and the comparative example differ from the first embodiment in that a lens screen's part (21) on the side of the front surface 21b is secured in a rectangular recess 22c (comparative example) or 22d (the second embodiment) by adhesive agents etc.

In the rectangular recesses 22c, 22d each formed on the back surface 22a of the retainer, their respective depths are established so that each fresnel lens screen 21 does not project from the recess 22' (22). That is, since the fresnel lens screen 21 is projected by the back surface 22a of the light transmissive screen retainer 22, it is possible to reduce the risk of lens breakage.

The screen assembly 20B' as a comparative example and the screen assembly 20B of the second embodiment operate as follows.

In the comparative example, as shown in FIG. 5A, the screen retainer 22 is formed with a thickness W2, while the fresnel lens screen 21 is formed with a thickness T. The screen retainer 22 is also provided, on the back surface 22a, with the rectangular recess 22c whose size and shape are substantially equal to those of the fresnel lens screen 21. In assembling, the fresnel lens screen 21 is accommodated and secured in the rectangular recess 22c adhesively. Therefore, optically, the image light Le incident on the back surface 21a of the screen 21 is converged at the diffusion membranes 22h to form an image and subsequently emitted toward the front surface 22b of the screen retainer 22.

On the other hand, owing to the absence of a blocking member around the fresnel lens screen 21, the overscanned light Lo from the projection unit 10 (FIG. 1) directly enters the screen retainer 22 through the back surface 22a and thereafter, the same light is emitted to the outside through the front surface 22b. Then, the so-emitted overscanned light Lo is brought into a user's view, disturbing an image to be formed by the image light Le transmitted through the fresnel lens screen 21.

On the contrary, as shown in FIG. 5B, the screen retainer 22 is provided, on the back surface 22a, with a rectangular recess 22d having a depth larger than the thickness T of the fresnel lens screen 21. Again, in comparison with the above recess 22c, the rectangular recess 22d is enlarged, for each side, by a thickness t of the blocking member 33 covering all four sides of the fresnel lens screen 21. In this way, the fresnel lens screen 21 is accommodated and secured in the rectangular recess 22d adhesively.

In terms of the behaviors of both image light Le and exterior light Lg after their incidences on the back surface 21a of the screen 21, the second embodiment is similar to the comparative example. However, as the overscanned light Lo is blocked by the blocking parts 23a to 23d of the blocking member 23, it is not projected to a user's side through the front surface 22b. Consequently, a user can see an image formed on the diffusion membranes 21h on the front surface 21b of the screen 21 as if the image were floating in the air.

As for material for the blocking member 23, similarly to the first embodiment, there are recommended a metallic thin plate in black, a resinous thin plate in black, a black film, etc. each having a thickness t less than 1 mm. Alternatively, although not shown in the figure, the screen assembly 20B may comprise a screen retainer (not shown) having a rectangular through-hole formed larger than the fresnel lens screen 21, a light blocking member (also not shown) composed of black-painted plates to be adhered to inner walls of the through-hole and the fresnel lens screen 21 inserted into the through-hole.

As similar to the first embodiment, the light blocking member 23 has the upper blocking part 23a whose depth B1 is equal to or more than the thickness T of the screen 21 (B1≧T), the lower blocking part 23b whose depth B2 is nearly equal to the thickness T (B2≈T) and the left and right blocking parts 23c, 23d tapered from their upper portions each having a width (depth) B1 to their lower portions each having a width (depth) B2. In this way, as the light blocking member 23 of the second embodiment operates as similar to that of the first embodiment, the overscanned light Lo is blocked by the respective blocking parts 23a to 23d perfectly, eliminating the possibility of overscanned light Lo being projected on the user's side.

Furthermore, the screen retainer 22 is formed, on the upside of the blocking part 23a, with a uniform width W3 larger than a width W2 of the comparative example. Here, the "uniform" width W3 means that the screen retainer's part above the blocking part 23a is formed so that the front surface 22b is parallel to the back surface 22a1. Likewise, the screen retainer 22 is formed, on the underside of the blocking part 23b, with a uniform width W4 narrower than the width W3. Also, the "uniform" width W4 means that the screen retainer's part under the blocking part 23b is formed so that the front surface 22b is parallel to the back surface 22a2. In this way, the screen retainer 22 is provided with uneven parallel back surfaces 22a1, 22a2.

Accordingly, as the overscanned light Lo is not projected to the use's side through the front surface 22b of the screen retainer 22 owing to the provision of the light blocking member 23 in the second embodiment, a user can see favorable images displayed on the screen assembly 20B.

Referring to FIGS. 6A to 6C, the first to third modifications of the screen assembly 20B of the second embodiment will be described in terms of their differences from the second embodiment, in brief. Note that in FIGS. 6A to 6C, constituents identical to those of the second embodiment of FIG. 5B are indicated with the same reference numerals respectively, and their descriptions are eliminated.

In the first modification shown in FIG. 6A, a screen assembly 20B1 is provided, along the side surfaces 21c to 21f (see FIGS. 1A to 3D) of the fresnel lens screen 21, with the light blocking member 23. In this modification, the screen retainer 22 is formed with a uniform width W3 above and below the rectangular recess 22d for accommodating the fresnel lens screen 21.

Therefore, when the fresnel lens screen 21 with the light blocking member 23 is arranged in the rectangular recess 22d so that an end (outer end) of the upper blocking part 23a is in alignment with the back surface 22a of the screen retainer 22, a step is produced between an end of the lower blocking part 23b and the back surface 22a. For this reason, according to the first modification, a screen retainer's part defining the lower edge of the rectangular recess 22d is chamfered in an arc (round chamfering) so as not to exert a negative effect on the image light Le projected toward the lower portion of the screen 21.

In the second modification shown in FIG. 6B, a screen assembly 20B2 comprises the screen retainer 22, the fresnel lens screen 21 and the light blocking member 23. Although the fresnel lens screen 21 and the light blocking member 23 are identical to those of the first modification respectively, the screen retainer 22 is formed so as to have a tapered back surface 22a3 along the slanted outlines of the left and right blocking parts 23c, 23d. Consequently, the screen retainer 22 is shaped with a top end having a width W5 and a lower end having a width W6 smaller than W5. Owing to the above formation of the screen retainer 22, it is possible exclude the possibility of exerting a negative effect on the image light Le projected toward the lower portion of the screen 21.

In the third modification shown in FIG. 6C, a screen assembly 20B3 comprises the screen retainer 22, the fresnel lens screen 21 and the light blocking member 23. In the screen assembly 20B3, the screen retainer 22 is identical to that of the first modification because of its uniform width W3. Further, the fresnel lens screen 21 and the light blocking member 23 are identical to the fresnel lens screen 21 and the light blocking member 23 of the first and second modification, respectively. The third modification differs from the first and second modification in that the fresnel lens screen 21 and the light blocking member 23 are arranged in the rectangular recess 22d at a slant so that the slanted outlines of the left and right blocking parts 23c, 23d are in alignment with the back surface 22a of the retainer 22. In other words, in the screen retainer 22, the rectangular recess 22d is formed so as to have its inside front surface 22d1 inclined to the back surface 22a of the retainer 22. Owing to the above arrangement of the fresnel lens screen 21 and the light blocking member 23, it is possible exclude the possibility of exerting a negative effect on the image light Le projected toward the lower portion of the screen 21.

$3^{rd}$. Embodiment

FIGS. 7A and 7B are longitudinal sectional views explaining the operation of blocking overscanned light against a screen retainer having visible optical transparency in the screen assembly of the third embodiment of the present invention. In the figures, FIG. 7A shows a comparative example to the third embodiment, while FIG. 7B shows the third embodiment of the present invention.

In common with a screen assembly 30A' and a screen assembly 30A of FIGS. 7A and 7B, a fresnel lens screen 31c is formed integrally with a screen retainer 31 having visible optical transparency. With the integration of the fresnel lens screen 31c with the screen retainer 31, it is possible to reduce the number of components of the screen assembly in comparison with the first and second embodiments.

Similar to the first and second embodiment, the fresnel lens screen 31c includes a number of wavelike fresnel lenses 31c1, providing a rectangular lens plate in e.g. 52 inch size.

In addition, light blocking membranes 31d for blocking exterior light Lg and milky diffusion membranes 31e for diffusing the image light Le (from the projection unit 10) after image formation in front are formed on the front surface 31b of the screen retainer 31 alternatively, corresponding to respective fresnel lenses 31c1.

The screen assembly 30A' as a comparative example and the screen assembly 30A of the second embodiment operate as follows.

In the comparative example, as shown in FIG. 7A, the screen retainer (part) 31 is formed with a thickness W1, while the fresnel lens screen (part) 31c is formed with a thickness T. The fresnel lens screen 31c is formed integrally with the back surface 31a of the screen retainer 31. Therefore, optically, the image light Le incident on the respective fresnel lenses 31c1 on the screen 31c is converged at the diffusion membranes 31e to form an image and subsequently emitted in front.

On the other hand, owing to the absence of a blocking member around the fresnel lens screen 31c, the overscanned light Lo from the projection unit 10 (FIG. 1) directly enters the screen retainer 31 through the back surface 31a and thereafter, the same light is emitted to the outside through the front surface 31b. Then, the so-emitted overscanned light Lo is brought into a user's view, disturbing an image to be formed by the image light transmitted through the fresnel lens screen 31c.

In the screen assembly 30A of the third embodiment, as shown in FIG. 7B, the fresnel lens screen 31c (thickness: T) is formed on the back surface 31a of the screen retainer 31 (thickness: W1) integrally, and the light blocking member 23 is arranged along respective side surfaces (not shown) of the fresnel lens screen 31c. Thus, in terms of the behaviors of both image light Le and exterior light Lg after their incidences on the respective fresnel lenses 31c1 of the screen 31c, the third embodiment of FIG. 7B is similar to the comparative example of FIG. 7A. However, as the overscanned light Lo is blocked by the blocking parts 23a to 23d of the blocking member 23, the same light Lo does not enter the screen retainer 31. Consequently, a user can see an image formed on the diffusion membranes 31e on the front surface 31b of the screen retainer 31 as if the image were floating in the air.

As for material for the blocking member 23, similarly to the first embodiment, there are recommended a metallic thin plate in black, a resinous thin plate in black, a black film, etc. each having a thickness t less than 1 mm.

As similar to the first and second embodiments, the light blocking member 23 has the upper blocking part 23a whose depth B1 is equal to or more than the thickness T of the screen 31c (B1≧T), the lower blocking part 23b whose depth B2 is nearly equal to the thickness T (B2≈T) and the left and right blocking parts 23c, 23d tapered from their upper portions each having a width (depth) B1 to their lower portions each having a width (depth) B2. In this way, as the light blocking member 23 of the third embodiment operates as similar to that of the first and second embodiments, the overscanned light Lo is blocked by the respective blocking parts 23a to 23d perfectly, eliminating the possibility of overscanned light Lo being projected on the user's side.

Accordingly, as the overscanned light Lo is not projected to the use's side through the front surface 31b of the screen retainer 31 owing to the provision of the light blocking member 23 in the third embodiment, a user can see favorable images displayed on the screen assembly 30A.

4th. Embodiment

Figure 8A:
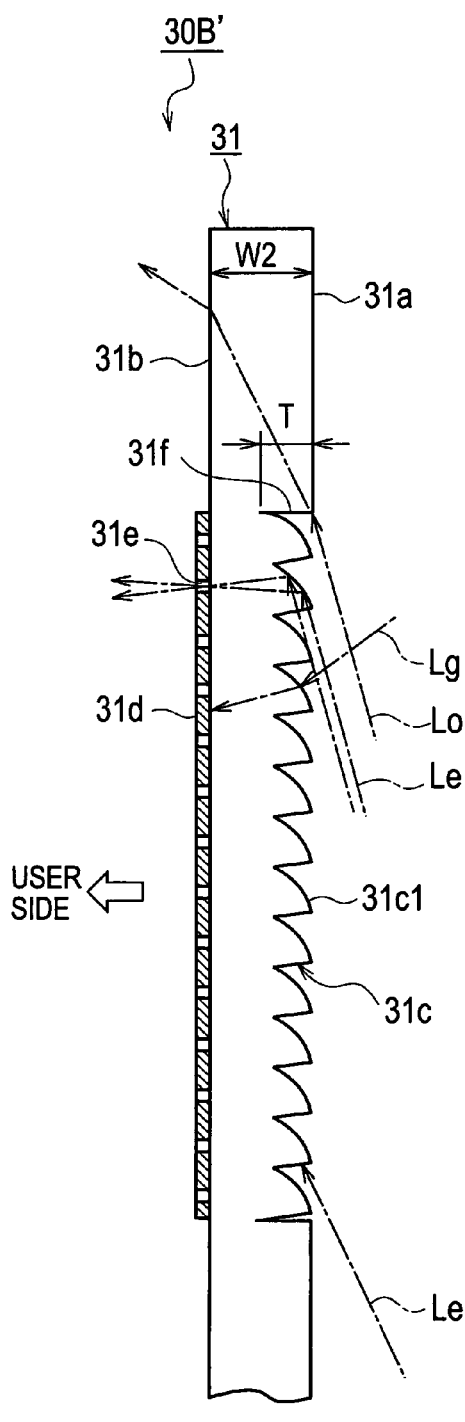
Figure 8B:
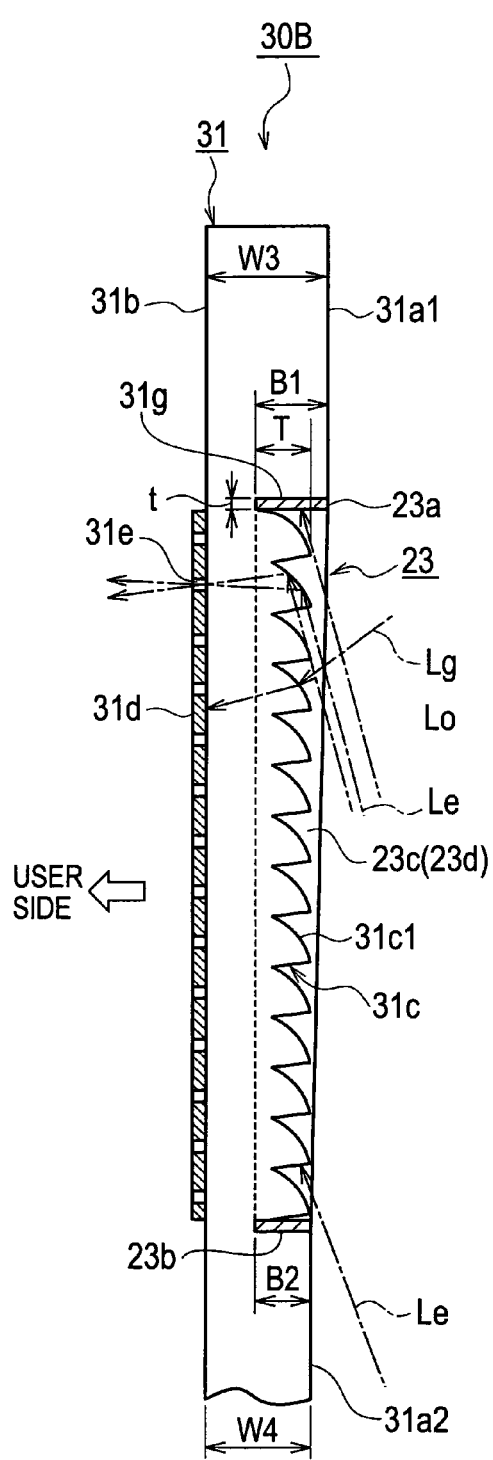

FIGS. 8A and 8B are longitudinal sectional views explaining the operation of blocking overscanned light against a screen retainer having visible optical transparency in the screen assembly of the fourth embodiment of the present invention. In these figures, FIG. 8A shows a comparative example to the fourth embodiment, while FIG. 8B shows the fourth embodiment.

As shown in FIGS. 8A and 8B, the fourth embodiment and the comparative example differ from the third embodiment in that screen assemblies 30W and 30B have respective rectangular recesses 31f, 31g formed on the back surfaces 31a, 31a1 of the screen retainers 31, 31 respectively. In addition, in each of the rectangular recesses 31f, 31g, a fresnel lens screen 31c is formed integrally with the screen retainer 31.

In common with the screen assemblies 30B', 30B, each rectangular recess 31f (31g) is formed in the screen retainer 31 (with a depth) so as not to cause the fresnel lens screen 31c to project from the back surface 31a (31a1). With the establishment of such a depth in the rectangular recess 31f (31g), the fresnel lens screen 31c is protected by the back surface 31a (31a1), reducing the possibility of a breakage of the fresnel lens screen 31.

The screen assembly 30B' as a comparative example and the screen assembly 30B of the second embodiment operate as follows.

In the comparative example, as shown in FIG. 8A, the screen retainer (part) 31 having a thickness W2 is provided, therein, with the rectangular recess 31f, while the fresnel lens screen (part) 31c having a thickness T is formed in the rectangular recess 31f integrally. Therefore, optically, the image light Le incident on the respective fresnel lenses 31c1 on the screen 31c is converged at the diffusion membranes 31e to form an image and subsequently emitted in front.

However, owing to the absence of a blocking member around the fresnel lens screen 31c, the overscanned light Lo from the projection unit 10 (FIG. 1) directly enters the screen retainer 31 through the back surface 31a and thereafter, the same light is emitted to the outside through the front surface 31b. Then, the so-emitted overscanned light Lo is brought into a user's view, disturbing an image to be formed by the image light transmitted through the fresnel lens screen 31c.

In the screen assembly 30B of the fourth embodiment, as shown in FIG. 8B, the screen retainer 31 is provided, inside the back surface 31a1, with the rectangular recess 31g having a depth B1 larger than the thickness T of the fresnel lens screen 31c and an area equal to or larger than a total area of the screen 31c and the light blocking member 23 (thickness: t). With the formation of the rectangular recess 31g, the fresnel lens screen 31c having the thickness T is formed integrally with the screen retainer 31 so as to reside in the rectangular recess 31g and furthermore, the light blocking member 23 is arranged around the fresnel lens screen 31c. Thus, in terms of the behaviors of both image light Le and exterior light Lg after their incidences on the respective fresnel lenses 31c1 of the screen 31c, the fourth embodiment of FIG. 8B is similar to the comparative example of FIG. 8A. However, as the overscanned light Lo is blocked by the blocking parts 23a to 23d of the blocking member 23, the same light Lo does not enter the screen retainer 31. Consequently, a user can see an image formed on the diffusion membranes 31e on the front surface 31b of the screen retainer 31 as if the image were floating in the air.

As for material for the blocking member 23, similarly to the third embodiment, there are recommended a metallic thin plate in black, a resinous thin plate in black, a black film, etc. each having a thickness t less than 1 mm.

As similar to the first to third embodiments, the light blocking member 23 has the upper blocking part 23a whose depth B1 is equal to or more than the thickness T of the screen 31c (B1≧T), the lower blocking part 23b whose depth B2 is nearly equal to the thickness T (B2≈T) and the left and right blocking parts 23c, 23d tapered from their upper portions each having a width (depth) B1 to their lower portions each having a width (depth) B2. In this way, as the light blocking member 23 of the fourth embodiment operates as similar to that of the first to third embodiments, the overscanned light Lo is blocked by the respective blocking parts 23a to 23d perfectly, eliminating the possibility of overscanned light Lo being projected on the user's side.

Furthermore, the screen retainer 32 is formed, on the upside of the blocking part 23a, with a uniform width W3 larger than a width W2 of the comparative example. Here, the "uniform" width W3 means that the screen retainer's part above the blocking part 23a is formed so that the front surface 31b is parallel to the back surface 31a1. Further, the screen retainer 32 is formed, on the underside of the blocking part 23b, with a uniform width W4 narrower than the width W3. Likewise, the "uniform" width W4 means that the screen retainer's part under the blocking part 23b is formed so that the front surface 31b is parallel to the back surface 31a2. In this way, the screen retainer 22 is provided with uneven parallel back surfaces 31a1, 31a2.

According to the fourth embodiment, as the overscanned light Lo is not projected to the use's side through the front surface 31b of the screen retainer 31 owing to the provision of the light blocking member 23, a user can see favorable images displayed on the screen assembly 30B.

In modification of the fourth embodiment, the screen assembly 30B may be modified in the same way as the above-mentioned modifications of FIGS. 6A to 6C, although their modifications are not shown in the figures.

Finally, it will be understood by those skilled in the art that the foregoing descriptions are nothing but embodiments and various modifications of the disclosed screen assembly and the rear-projection type graphic display device and therefore, various changes and modifications may be made within the scope of claims.

What is claimed is:

1. A screen assembly comprising:
   a screen having a first surface formed with fresnel lenses and a second surface located behind the first surface, the screen allowing an incoming of an image light through the first surface and allowing an emission of the image light through the second surface, the screen having an optical transparency;
   a screen retainer on which the screen is mounted, the screen retainer having a third surface whose area is larger than the first surface and the second surface of the screen and which is opposed to the second surface of the screen thereby to hold the screen by adhering to the second surface, and a fourth surface located behind the third surface thereby to allow an image formed by the image light incoming through the first surface to be visible through the fourth surface, the screen retainer having an optical transparency, wherein the first, second, third and fourth surfaces are arranged in parallel in this order; and
   a light blocking member surrounding respective side surfaces of the screen in the form of a frame, wherein the light blocking member is formed so that at least part thereof extends over the first surface of the screen on a light incoming side of the image light.

2. The screen assembly of claim 1, wherein
   the screen retainer is formed with a thickness larger than a thickness of the screen and also provided, on the side of the third surface, with a recess having a depth larger than the thickness of the screen and an area larger than a total area of the screen and the light blocking member,
   the screen is retained in the recess so that the second surface is opposed to the screen retainer, and
   the light blocking member is arranged on the side surfaces of the screen.

3. The screen assembly of claim 1, wherein
   the light blocking member is rectangular-shaped with a first blocking part, a second blocking part opposed to the first blocking part, a third blocking part connecting the first blocking part with the second blocking part and a fourth blocking part opposed to the third blocking part to also connect the first blocking part with the second blocking part, all of the blocking parts forming respective side surfaces of the light blocking member,
   the first blocking part has a thickness larger than the thickness of the screen and is arranged so as to project on the side of the first surface of the screen,
   the second blocking part has a thickness substantially equal to the thickness of the screen, and
   each of the third blocking part and the fourth blocking part is formed to have a thickness equal to or more than the thickness of the screen.

4. The screen assembly of claim 2, wherein
   the screen is fixed on the third surface of the screen retainer or secured in the recess on the side of the third surface integrally.

5. The screen assembly of claim 2, wherein
   the screen is formed, on the third surface, integrally with the screen retainer or formed, in the recess on the side of the third surface, integrally with the screen retainer.

6. The screen assembly of claim 1, wherein
   the light blocking member is made from a metallic plate having a predetermined thickness.

7. The screen assembly of claim 1, wherein
   the light blocking member is made from a resinous plate having a predetermined thickness.

8. The screen assembly of claim 1, wherein
   the screen is fixed in the recess on the side of the third surface of the screen retainer integrally or formed, in the recess of the third surface, integrally with the screen retainer, and
   the light blocking member is formed by coating material that does not allow a transmission of light incident on respective side surfaces in the recess on the side of the third surface.

9. A rear-projection type graphic display device comprising:
   a screen assembly including:
   a screen having a first surface formed with fresnel lenses and a second surface located behind the first surface, the screen allowing an incoming of an image light through the first surface and allowing an emission of the image light through the second surface, the screen having an optical transparency;
   a screen retainer on which the screen is mounted, the screen retainer having a third surface whose area is larger than the first surface and the second surface of the screen thereby and which is opposed to the second surface of the screen thereby to hold the screen by adhering to the second surface, and a fourth surface located behind the third surface thereby to allow an image formed by the image light incoming through the first surface to be visible through the fourth surface, the screen retainer having an optical transparency, wherein the first, second, third and fourth surfaces are arranged in parallel in this order; and
   a light blocking member surrounding respective side surfaces of the screen in the form of a frame, wherein the light blocking member is formed so that at least part thereof extends over the first surface of the screen on a light incoming side of the image light;

a projection unit emitting the image light based on input signals from an outside;

a reflection mirror reflecting the image light emitted from the projection unit toward the screen assembly thereby to project an image thereon in enlargement; and a cabinet on which the screen assembly stands and in which the projection unit and the reflection mirror are accommodated.

\* \* \* \* \*